United States Patent
Nagase et al.

(10) Patent No.: US 8,125,426 B2
(45) Date of Patent: Feb. 28, 2012

(54) IMAGE DISPLAYING APPARATUS AND IMAGE DISPLAYING METHOD

(75) Inventors: Akihiro Nagase, Tokyo (JP); Jun Someya, Tokyo (JP); Hiroaki Sugiura, Tokyo (JP); Hiroshi Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 753 days.

(21) Appl. No.: 12/003,185

(22) Filed: Dec. 20, 2007

(65) Prior Publication Data

US 2008/0246715 A1 Oct. 9, 2008

(30) Foreign Application Priority Data

Apr. 5, 2007 (JP) ................. 2007-099461

(51) Int. Cl.
*G09G 3/36* (2006.01)

(52) U.S. Cl. ............ 345/87; 345/90; 345/207; 250/205; 250/227.2; 250/227.21; 250/552; 250/553; 348/744; 348/745; 348/749; 348/656; 348/657; 349/5

(58) Field of Classification Search ............ 345/90, 345/87, 207; 348/744–747, 656–658, 191; 250/205, 227.2, 227.21, 214 R, 214 C, 552, 250/553; 349/5
See application file for complete search history.

(56) References Cited

U.S. PATENT DOCUMENTS

| 5,245,199 | A * | 9/1993 | Okitsu ............... 250/559.44 |
| 5,479,225 | A * | 12/1995 | Kuga .................. 353/101 |
| 6,892,009 | B2 * | 5/2005 | Ito et al. .............. 385/49 |
| 7,050,120 | B2 * | 5/2006 | Allen et al. ........... 348/742 |
| 7,187,493 | B2 * | 3/2007 | Sasaki et al. ......... 359/381 |
| 7,189,584 | B2 * | 3/2007 | Kuo .................... 438/7 |
| 2002/0109821 | A1 * | 8/2002 | Huibers et al. ......... 353/84 |
| 2004/0141161 | A1 * | 7/2004 | Hibi et al. ............. 353/99 |
| 2004/0179172 | A1 * | 9/2004 | Kobayashi et al. ...... 353/119 |
| 2005/0206855 | A1 * | 9/2005 | Hori ................... 353/84 |
| 2005/0248737 | A1 * | 11/2005 | Engle .................. 353/122 |
| 2010/0253812 | A1 * | 10/2010 | Nakata ................ 348/243 |

FOREIGN PATENT DOCUMENTS

| JP | 9-163391 A | 6/1997 |
| JP | 2001-331155 A | 11/2001 |
| JP | 2004-309543 A | 11/2004 |
| JP | 2005-300899 A | 10/2005 |
| JP | 2006-78761 A | 3/2006 |
| JP | 3803427 B2 | 5/2006 |
| JP | 2006-227083 A | 8/2006 |
| JP | 2007-65012 A | 3/2007 |
| JP | 2008-39957 A | 2/2008 |

* cited by examiner

*Primary Examiner* — Lun-Yi Lao
*Assistant Examiner* — Priyank Shah
(74) *Attorney, Agent, or Firm* — Birch, Stewart, Kolasch & Birch, LLP

(57) ABSTRACT

In an image displaying apparatus, first and second detecting units detect quantities of light propagating through a light path at two different locations. A variation calculating unit calculates the variation in the light quantity in the light path based on the quantities of light detected by each of the first and second detecting units. A controlling unit controls the quantity of light propagated to the screen if the variation in the light quantity exceeds a predetermined value.

14 Claims, 16 Drawing Sheets

IMAGE DISPLAYING APPARATUS AND IMAGE DISPLAYING METHOD

BACKGROUND OF THE INVENTION

1. Field of the Invention

The present invention relates to an image displaying apparatus and an image displaying method that controls a quantity of light to propagate through a light path when there is a fault in the light path when displaying an image.

2. Description of the Related Art

A projector-type image displaying apparatus is known in the art that modulates light output from a light source, and enlarges and projects the modulated light onto a screen. Specifically, in the projector-type image displaying apparatus, the light output from the light source is collected at a lens, and then illumination intensity across a cross section of the light flux is made uniform. Subsequently, the light with uniform illumination intensity is modulated, and enlarged and projected on the screen to display the image. A spatial light modulator is used to modulate the light.

A micromirror device, such as a digital micro-mirror device (DMD) (Registered Trademark), is used as a spatial light modulator (light modulating element). The light emitted from the light source is filtered through a color wheel and then passed to the spatial light modulator. The light modulator reflects the light selectively, according to video signals; therefore, only valid lights are projected onto the screen through projecting lens. A related technology has been disclosed, for example, in Japanese Patent Application Laid-Open No. H9-163391.

To accommodate an optical system (light path) from the light source to the light modulator in a chassis of a limited depth, it is sometimes necessary to separate the light source and light modulator. If the light source and light modulator are separates, then it becomes necessary to create a light path from the light source to the light modulator with the help of mirrors, prisms, optical fibers, etc. However, in such an arrangement, a fault may occur due to degradation of a reflecting surface of the mirror or the optical fiber. The light modulator can not receive appropriate quantity of light if there is a fault. This may result in a disturbed image displayed on the screen.

SUMMARY OF THE INVENTION

It is an object of the present invention to at least partially solve the problems in the conventional technology.

According to an aspect of the present invention, there is provided an image displaying apparatus that spatially modulates light emitted from a light source based on information about an image to be displayed and projects out the modulated light onto a screen. The image displaying apparatus includes a detecting unit detects a variation in the light quantity in a light path between the light source and the screen; and a controlling unit that controls a quantity of the light to be propagated to the screen if the variation in the light quantity exceeds a predetermined value.

According to another aspect of the present invention, there is provided a method involving spatially modulating light emitted from a light source based on information about an image to be displayed and projecting out the modulated light onto a screen. The method includes detecting a variation in the light quantity in the light path; and controlling a quantity of the light to be propagated to the screen if the variation in the light quantity exceeds a predetermined value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below while referring to accompanying drawings. These exemplary embodiments are not intended to limit the scope of the present invention.

Figure 1:
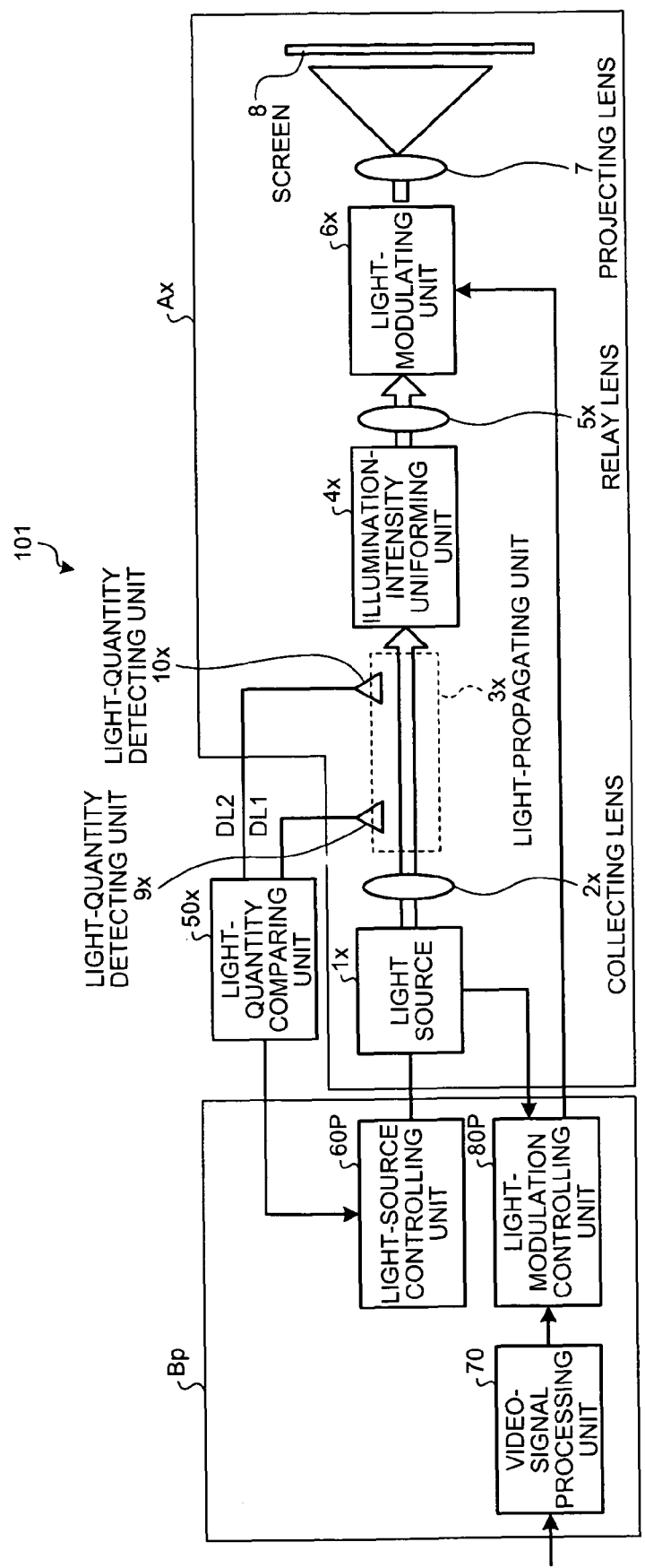
FIG. 1 is a block diagram of an image displaying apparatus according to a first embodiment of the present invention.

FIG. 1 is a schematic of an image displaying apparatus 101 according to a first embodiment of the present invention. The image displaying apparatus 101 is a projector-type image displaying apparatus in which light emitted from a light source is collected at a lens where illumination intensity across a cross section of the light flux is uniformed, and the light is spatially modulated, enlarged, and projected onto a screen. In the image displaying apparatus 101, the quantity of light emitted from the light source is controlled (ON/OFF of the light source is controlled) based on a light quantity detection signal that changes according to a strength (a quantity) of the light propagating through a light path.

The image displaying apparatus 101 includes an optical system Ax, an electrical controlling system Bp, and a light-quantity comparing unit 50x. The light to display an image propagates through the optical system Ax. The electrical controlling system Bp controls elements such as the optical system Ax. The light-quantity comparing unit 50x monitors a quantity of light propagating through the optical system Ax.

The optical system Ax is explained in detail below. The optical system Ax according to the first embodiment of the present invention includes a light source 1x, a collecting lens 2x, a light-propagating unit 3x, an illumination-intensity uniforming unit 4x, a relay lens 5x, a light-modulating unit 6x, a projecting lens unit 7, and a screen 8.

The light emitted from the light source 1x propagates through the collecting lens 2x and the light-propagating unit 3x, and reaches the illumination-intensity uniforming unit 4x. The light output by the illumination-intensity uniforming unit 4x passes through the relay lens 5x, and reaches the light-modulating unit 6x. The light output by the light-modulating unit 6x is projected onto the screen 8 through the projection lens unit 7.

A red light, a blue light, and a green light, for example, are emitted from the light source 1x sequentially by time sharing toward the collecting lens 2x. The collecting lens 2x converts the received light into parallel light, and passes the parallel light to the light-propagating unit 3x.

The light-propagating unit 3x is positioned between the collecting lens 2x and the illumination-intensity uniforming unit 4x. The light-propagating unit 3x a front light-quantity detecting unit 9x and a rear light-quantity detecting unit 10x. The light-quantity detecting units 9x and 10x are arranged at the ends of the light-propagating unit 3x. The light-quantity detecting unit 9x is positioned right after the collecting lens 2x, and the light-quantity detecting unit 10x is positioned right before the illumination-intensity uniforming unit 4x.

The light-propagating unit 3x propagates the light received through the collecting lens 2x, and passes the light to the illumination-intensity uniforming unit 4x. The light-propagating unit 3x deflects the course of the light using a prism (not shown) or mirrors (not shown) as required.

The illumination-intensity uniforming unit 4x is an optical integrator, such as a kaleidoscope, having a shape of a rod. Light enters from one end of the rod, gets reflected repeatedly on internal surface of the rod, and output from the other end of the rod. The illumination-intensity uniforming unit 4x outputs the lights received from the light-propagating unit 3x to the relay lens 5x.

The relay lens 5x is a lens that expands the light received from the illumination-intensity uniforming unit 4x and transfers an image (a real or false image) to the light-modulating unit 6x. In other words, the light output from the illumination-intensity uniforming unit 4x is passed to the light-modulating unit 6x through the relay lens 5x.

The light-modulating unit 6x is a reflecting-type light modulating element such as a digital micro-mirror device (DMD) (Registered Trademark). A DMD has arrays of hundreds of thousands of small, tilted mirrors. Each mirror generates light corresponding to one pixel of the image. These mirrors are controlled based on a signal received from an after-mentioned light-modulation controlling unit 80P. An image displayed based on the light output from the light-modulating unit 6x corresponds to an image based on the video signals input to the image displaying apparatus 101.

The projecting lens unit 7 expands the light modulated by the light-modulating unit 6x, and projects the enlarged light to the screen 8. The screen 8 displays the light projected from the projecting lens unit 7 as an image.

The electrical controlling system Bp is explained in detail below. The electrical controlling system Bp includes a light-source controlling unit (a controlling unit) 60P, a video-signal processing unit 70, and the light-modulation controlling unit 80P. The video-signal processing unit 70 is connected to the light-modulation controlling unit 80P. The light-modulation controlling unit 80P is connected to the light source 1x and the light-modulating unit 6x. The light-source controlling unit 60P is connected to the light-quantity comparing unit 50x and the light source 1x.

The light-source controlling unit 60P outputs a predetermined output current (a current that controls a lamp 11 to turn ON or OFF) to the light source 1x based on a control signal CDL output from the light-quantity comparing unit 50x.

The video-signal processing unit 70 receives video signals from an external apparatus. The video-signal processing unit 70 performs A/D conversion, Y/C separation, chroma decoding, or IP conversion, for example, upon receiving NTSC signals.

The video-signal processing unit 70 expands the video signals to a size that is appropriate to the resolution of the light-modulating unit 6x. If the resolution of the light-modulating unit 6x is 1980 pixels×1080 lines, the video-signal processing unit 70 expands the video signals to 1980 pixels× 1080 lines.

The video-signal processing unit 70 also performs chromatic conversion and converts the video signals to a red, green, and blue format. The video-signal processing unit 70 outputs the processed video signals to the light-modulation controlling unit 80P.

The light-modulation controlling unit 80P stores the video signal received from the video-signal processing unit 70 in a frame memory (not shown). The light-modulation controlling unit 80P determines a color of the light emitted from the light source 1x based on a timing signal. CT received from the light source 1x. The light-modulation controlling unit 80P reads the image signals of the determined color from the frame memory, and outputs the signals to the light-modulating unit 6x. For example, if the light source 1x emits red light, the light-modulation controlling unit 80P reads red video signals from the frame memory and outputs the read video signals to the light-modulating unit 6x.

The light-quantity comparing unit 50x monitors changes in the strength of the light propagating through the light-propagating unit 3x. The light-quantity comparing unit 50x calculates a difference between light quantity detection signals DL output from each of the light-quantity detecting units 9x and 10x, compares the difference with a predetermined threshold, and outputs a predetermined control signal (a signal to keep the light source ON or to turn it OFF) based on the result of the comparison. The light-quantity comparing unit 50x transmit the controlling signal to the light-source controlling unit 60P.

Figure 2:
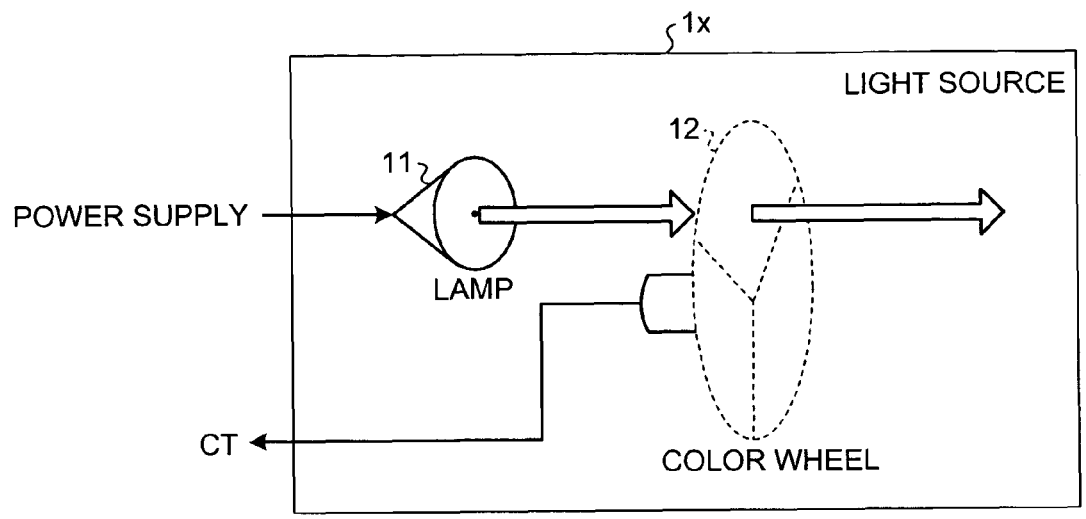
FIG. 2 is a schematic of an internal structure of a light source shown in FIG. 1.

The light source 1x is explained in detail below. FIG. 2 is a schematic of an internal structure of the light source 1x. The light source 1x includes the lamp 11 and a color wheel 12. The lamp 11 outputs a white light. Thus, the lamp 11 can be a high-pressure mercury lamp. The light emitted from the lamp 11 is directed to the color wheel 12.

The color wheel 12 includes color filters arranged on a disk, and a motor that rotates the disk. The color filters includes filter of various colors. For the sake of explanation, it is assumed that the color filters include filters of three primary colors red, green, and blue.

The color wheel 12, i.e., the color filters, is driven at a speed of an integral multiple of a vertical synchronizing signal for the video. When the white light emitted from the lamp 11 falls on the rotating color filters, only red, green, or blue light passes though the color filters in time sharing manner to the collecting lens 2x. The light source 1x outputs the timing signal CT indicating the timing at which the red, green, and blue light is respectively emitted, to the light-modulation controlling unit 80P.

Figure 3:
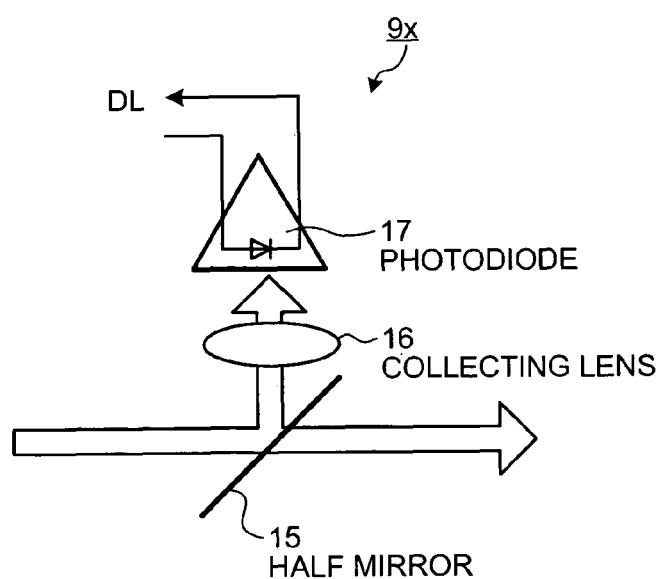
FIG. 3 is a schematic of a structure of a light-quantity detecting unit shown in FIG. 1.

A structure of the light-quantity detecting units 9x and 10x is described in detail below. FIG. 3 is a schematic of the light-quantity detecting units 9x. The light-quantity detecting unit 10x has the same of similar structure.

The light-quantity detecting unit 9x includes a half mirror 15, a collecting lens 16, and a photodiode 17. The half mirror 15 separates a part of the light propagating from the collecting lens 2x to the illumination-intensity uniforming unit 4x. The collecting lens 16 collects the separated light and irradiates the photodiode 17 with the separated light. The photodiode 17 outputs a light quantity detection signal DL corresponding to the strength of the irradiated light to the light-quantity comparing unit 50x. In the first embodiment of the present invention, the light-quantity detecting unit 9x outputs a light quantity detection signal DL1 (a light quantity detected at the front-side) to the light-quantity comparing unit 50x, and the light-quantity detecting unit 10x outputs a light quantity detection signal DL2 (a light quantity detected at the rear-side) to the light-quantity comparing unit 50x.

Figure 4:
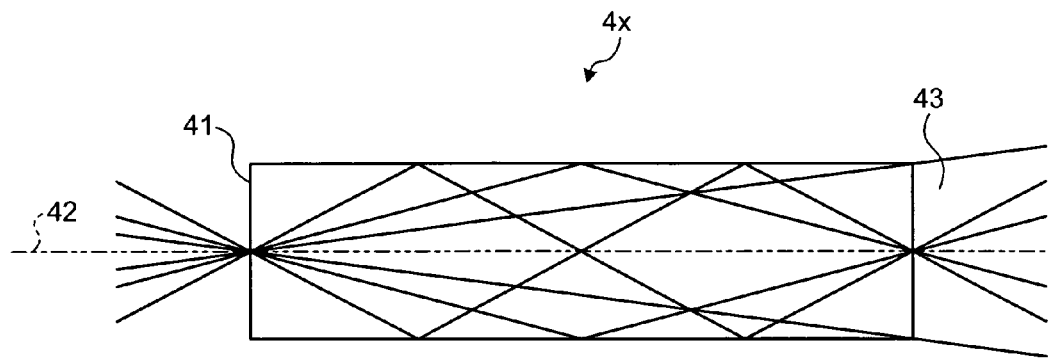
FIG. 4 is a schematic for explaining an operation of an illumination-intensity uniforming unit shown in FIG. 1.

An operation of the illumination-intensity uniforming unit 4x is described in detail below. FIG. 4 is a schematic for explaining the functioning of the illumination-intensity uniforming unit 4x. The illumination-intensity uniforming unit 4x has an injecting end surface 41 at one end (on the side closer to the light-propagating unit 3x) (front side), and ejecting end surface 43 at the other end (on the side closer to the relay lens 5x) (rear side).

The light from the light-propagating unit 3x is injected to the injecting end surface 41 with a predetermined angle with respect to a light axis 42. The injected light propagates by being repeatedly reflected on the surface of the rod, and is ejected from the ejecting end surface 43. The how many times the light is reflected on the rod surface depends on the angle the light is injected to the rod. In this manner, the lights are reflected for different number of times and mixed in the rod, and ejected from the ejecting end surface 43 as a uniform light. The ejected uniform light is sent to the relay lens 5x.

Figure 5:
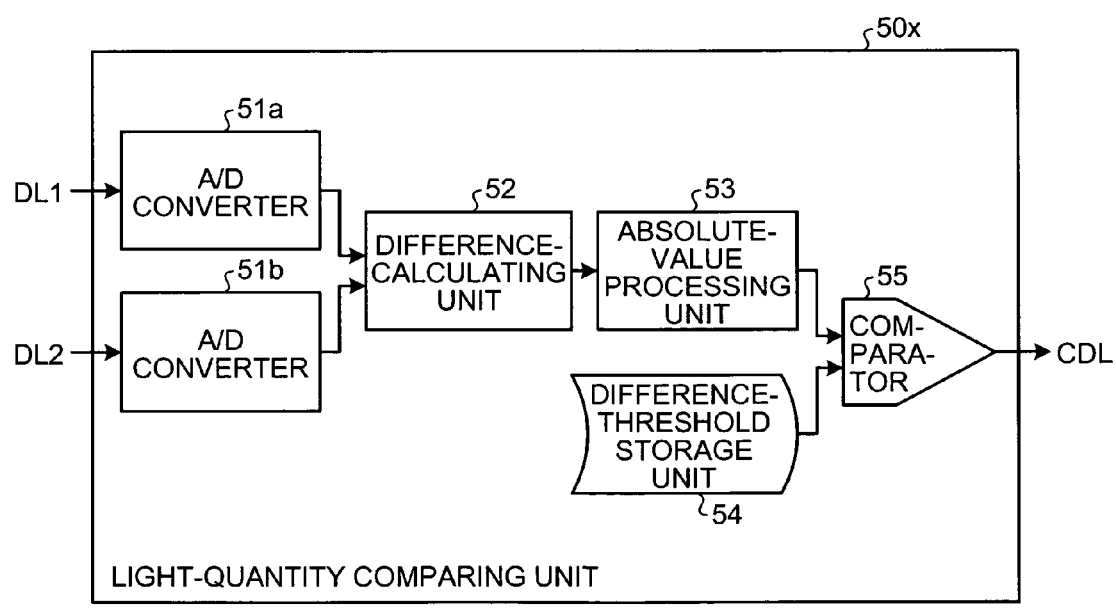
FIG. 5 is a block diagram of a light-quantity comparing unit shown in FIG. 1.

A structure of the light-quantity comparing unit 50x is explained in detail below. FIG. 5 is a block diagram of the light-quantity comparing unit 50x. The light-quantity comparing unit 50x includes two A/D converters 51a, 51b, a difference-calculating unit 52, an absolute-value processing unit 53, a difference-threshold storage unit 54, and a comparator 55.

The A/D converter 51a is connected to the light-quantity detecting unit 9x, and the A/D converter 51b is connected to the light-quantity detecting unit 10x. The A/D converters 51a, 51b are connected to the difference-calculating unit 52, and the difference-calculating unit 52 is connected to the absolute-value processing unit 53. The comparator 55 is connected to the absolute-value processing unit 53 and the difference-threshold storage unit 54. The comparator 55 is also connected to the light-source controlling unit 60P.

The A/D converter 51a converts the light quantity detection signal DL1 to a digital signal, and sends the digital signal to the difference-calculating unit 52. The A/D converter 51b converts the light quantity detection signal DL2 to a digital signal, and sends the digital signal to the difference-calculating unit 52.

The difference-calculating unit 52 calculates the difference between the two digital signals, and sends the calculated difference to the absolute-value processing unit 53. The absolute-value processing unit 53 takes the absolute value of the difference, and sends the absolute value to the comparator 55. The difference-threshold storage unit 54 is storage, such as a memory, that stores therein a difference threshold TDL.

The comparator 55 compares the threshold TDL with the absolute value of the difference and outputs the controlling signal CDL based on the result of the comparison. The comparator 55 sends the controlling signal CDL to the light-source controlling unit 60P.

For ease of explanations, it is described herein that the threshold TDL is stored in the difference-threshold storage unit 54 in advance. However, the threshold TDL may be instructed to the comparator 55 by way of a microcomputer, etc.

Figure 6:
FIG. 6 is an exemplary waveform of a controlling signal CDL.

One example of the control signal CDL sent from the comparator 55 to the light-source controlling unit 60P is explained in detail below. FIG. 6 is a waveform of one example of the controlling signal CDL. In FIG. 6, the horizontal axis indicates the difference abs (DL2−DL1) output from the absolute-value processing unit 53, and the vertical axis indicates the controlling signal CDL output from the comparator 55.

If the difference abs (DL2−DL1) is smaller than threshold TDL, then the comparator 55 outputs the controlling signal CDL of "1". If the difference abs (DL2−DL1) is equal to or larger than threshold TDL, then the comparator 55 outputs the controlling signal CDL of "0". The controlling signal CDL "1" indicates that it is not necessary to control (turn OFF) the light emitted from the light source 1x. The controlling signal CDL "0" indicates that it is necessary to control (turn OFF) the light emitted from the light source 1x.

Figure 7:
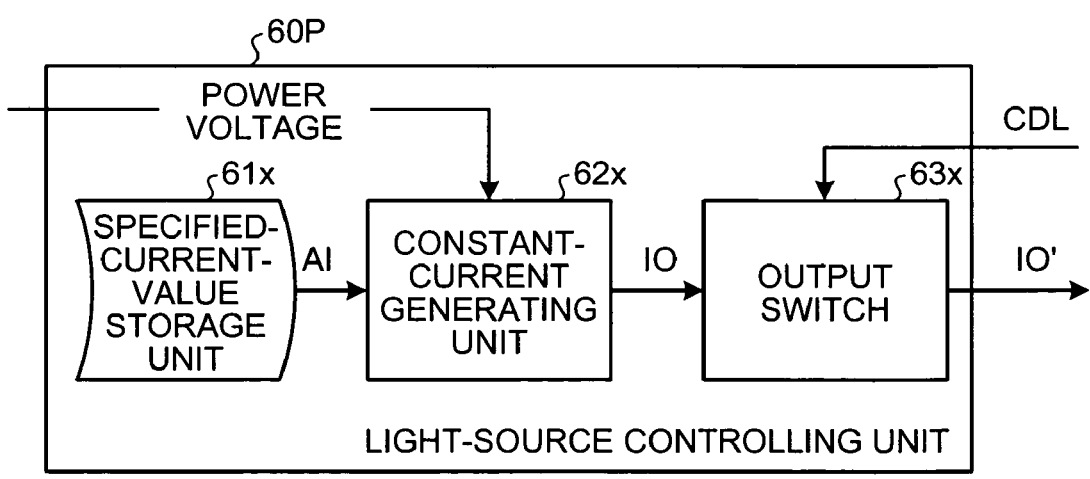
FIG. 7 is a block diagram of a light source-controlling unit shown in FIG. 1.

A structure of the light-source controlling unit 60P is explained in detail below. FIG. 7 is a block diagram of the light-source controlling unit 60P. The light-source controlling unit 60P includes a specified-current-value storage unit 61x, a constant-current generating unit 62x, and an output switch 63x. The constant-current generating unit 62x is connected to the specified-current-value storage unit 61x and to the output switch 63x. The output switch 63x is connected to the light-quantity comparing unit 50x and the light source 1x.

The specified-current-value storage unit 61x is a storage, such as a memory, that stores therein a specified current value AI. The constant-current generating unit 62x outputs a current IO corresponding to the specified current value AI, which is stored in the specified-current-value storage unit 61x, to the output switch 63x from an external power supply.

The output switch 63x controls the output current IO' to be output to the light source 1x according to the control signal CDL. If the control signal CDL is "1", then the output switch 63x outputs an output current IO' with IO'=IO. In this manner, the lamp 11 in the light source 1x is kept turned ON. If the control signal CDL is "0", then the output switch 63x outputs the output current IO' with IO'=0 (zero). In this manner, the lamp 11 in the light source 1x is turned OFF.

Figure 8:
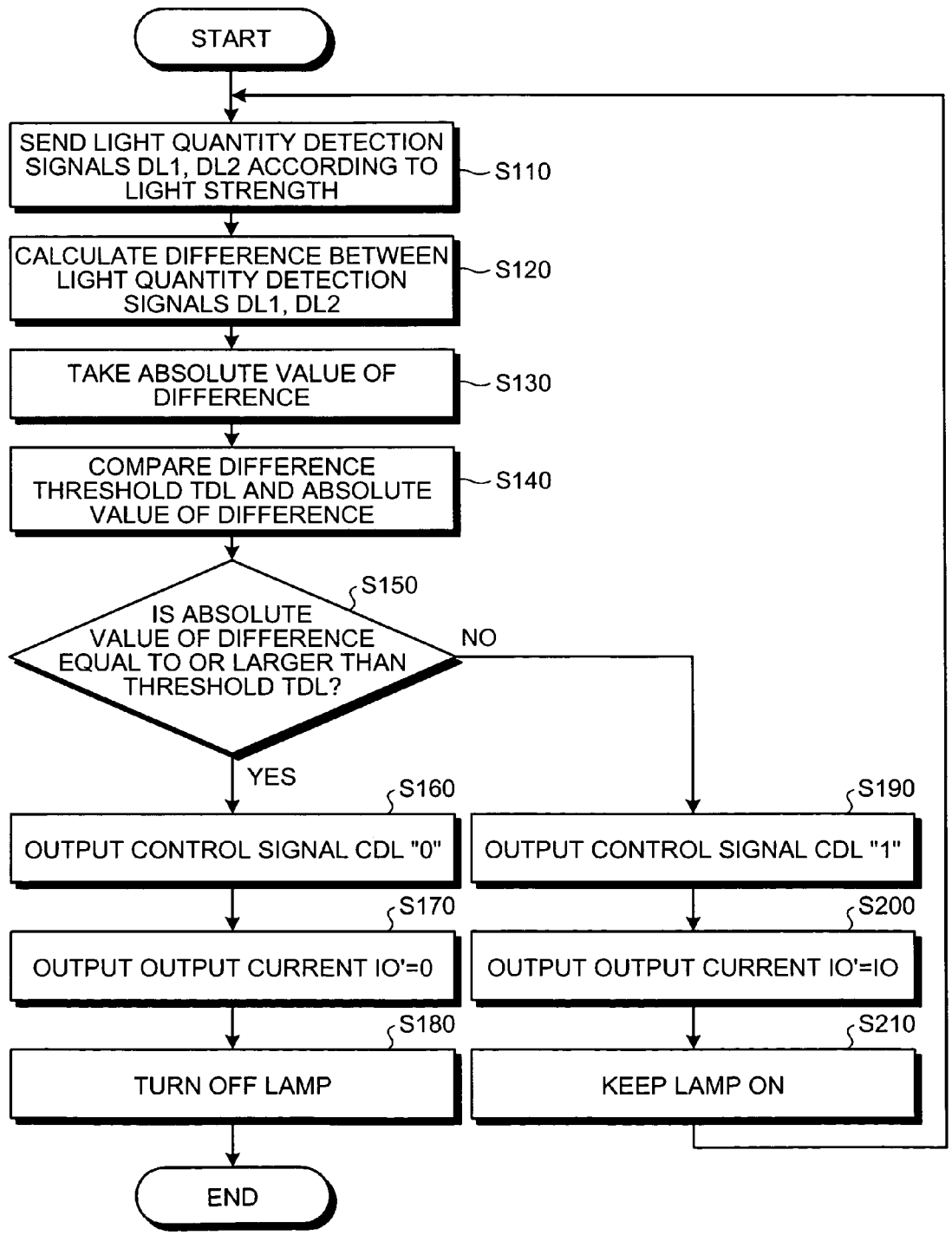
FIG. 8 is a flowchart of an operation performed by the image displaying apparatus shown in FIG. 1.

An operation of the image displaying apparatus 101 is described in detail below. FIG. 8 is a flowchart of the operation of the image displaying apparatus 101. When the image displaying apparatus 101 starts to display the image, the light-quantity detecting unit 9x detects strength of the light at one end of the light-propagating unit 3x (right after the collecting lens 2x). The light-quantity detecting unit 10x detects strength of the light at the other end of the light-propagating unit 3x (right before the illumination-intensity uniforming unit 4x).

Specifically, the light-quantity detecting units 9x and 10x separate a part of the light propagating from the collecting lens 2x to the illumination-intensity uniforming unit 4x (the light propagating through the light-propagating unit 3x) using the half mirror 15. The separated light is collected at the collecting lens 16, and irradiated to the photodiode 17. Depending on the strength of the irradiated light, the photodiode 17 outputs the light quantity detection signal DL to the light-quantity comparing unit 50x. The light-quantity detecting unit 9x send the light quantity detection signal DL1 in accordance to the light strength detected right after the collecting lens 2x to the light-quantity comparing unit 50x. The light-quantity detecting unit 10x send the light quantity detection signal DL2 in accordance to the light strength detected right before the illumination-intensity uniforming unit 4 to the light-quantity comparing unit 50x (Step S110).

The A/D converter 51a in the light-quantity comparing unit 50x converts the light quantity detection signal DL1 received from the light-quantity detecting unit 9x to a digital signal and send the digital signal to the difference-calculating unit 52. The A/D converter 51b in the light-quantity comparing unit 50x converts the light quantity detection signal DL2 output from the light-quantity detecting unit 10x to a digital signal and sends the digital signal to the difference-calculating unit 52.

The difference-calculating unit 52 calculates a difference between the two digital signals, and sends calculated difference to the absolute-value processing unit 53 (Step S120). The absolute-value processing unit 53 takes the absolute value of the difference, and sends the absolute value to the comparator 55 (Step S130).

The comparator 55 compares the threshold TDL, which is stored in advance in the difference-threshold storage unit 54, with the absolute value of the difference received from the absolute-value processing unit 53 (Step S140).

If the absolute value of the difference is equal to or larger than the difference threshold TDL (YES at Step S150), the comparator 55 outputs the control signal CDL "0" to the light-source controlling unit 60 (Step S160).

The constant-current generating unit 62x in the light-source controlling unit 60P outputs the current IO corresponding to the specified current value AI stored in the specified-current-value storage unit 61x to the output switch 63x. The output switch 63x outputs the output current IO' (IO'=0) corresponding to the controlling signal CDL "0" received from the light-quantity comparing unit 50x to the light source 1x (Step S170). Upon receiving the output current IO', the lamp 11 in the light source 1x is turned off (Step S180).

If the absolute value of the difference is smaller than the difference threshold TDL (NO at Step S150), the comparator 55 outputs the control signal CDL "1" to the light-source controlling unit 60 (Step S190).

The constant-current generating unit 62x in the light-source controlling unit 60P outputs the current IO corresponding to the specified current value AI, stored in the specified-current-value storage unit 61x, to the output switch 63x. The output switch 63x outputs the output current IO' (IO'=IO) corresponding to the controlling signal CDL "1" received from the light-quantity comparing unit 50x to the light source 1x (Step S200). When the output current IO' is received, the lamp 11 in the light source 1x is kept turned ON (Step S210).

In the first embodiment of the present invention, the light-quantity detecting units 9x and 10x have the half mirror 15 and the collecting lens 16, as shown in FIG. 3. However, structures of the light-quantity detecting units 9x and 10x other than that shown in FIG. 3 are still possible.

Figure 9:
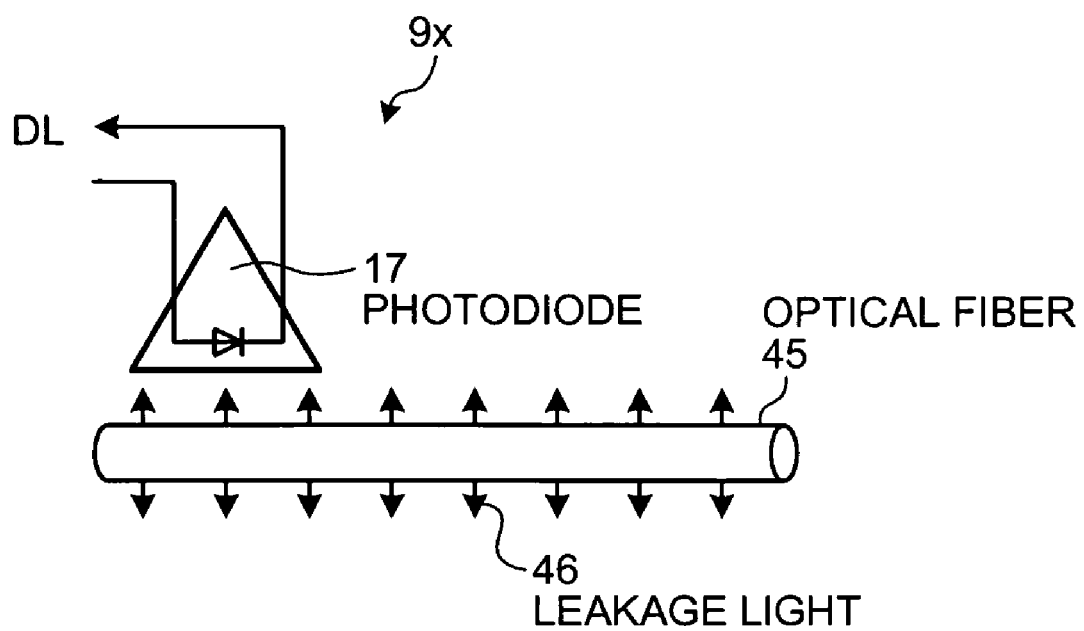
FIG. 9 is a schematic of an alternative structure of the light quantity-detecting unit shown in FIG. 1.

FIG. 9 an alternative structure of the light-quantity detecting unit 9x. The light-quantity detecting unit 10x has the same or similar structure. In the explanation of the light-quantity detecting units 9x and 10x with reference to FIG. 3, the light was propagated through the light-propagating unit 3x by the prism or the mirror inflecting the light axis. Alternatively, as shown in FIG. 9, an optical fiber 45 made of silica glass or plastic may be used as the light-propagating unit 3x.

The optical fiber 45 propagates the light by taking advantage of the difference in refractive index between a core and a clad thereof, with the effect of total internal reflection at boundary between the core and the clad. Factors such as a stress added to the optical fiber 45 propagating the light result in emission of weak leakage light 46 from the optical fiber 45.

In the light-quantity detecting unit 9x shown in FIG. 9, the leakage lights 46 from the optical fiber 45 are detected by the photodiode 17. The photodiode 17 outputs the light quantity detection signal DL in accordance with strength of the light irradiated thereto to the light-quantity comparing unit 50x. Therefore, even if the optical fiber 45 is used as a transmission medium of the light, a faulty light propagation can be detected, such as those caused by the optical fiber 45 being broken.

In the first embodiment of the present invention, it is explained that two light-quantity detecting units 9x and 10x are provided in the light-propagating unit 3x. However, three or more light-quantity detecting units may be provided in the light-propagating unit 3x. Moreover, it is explained that the light source 1x is tuned OFF when a faulty light propagation occurs. However, the light source 1x may also be controlled to reduce the emitted light quantity.

In the manner described above, the light-quantity detecting units 9x, 10x output the light quantity detection signal DL1, DL2 according to the strength of the light propagating through the light-propagating unit 3x. Therefore, if a faulty light propagation occurs in the light-propagating unit 3x, the fault can be detected.

Furthermore, the lamp 11 can be controlled to stop emitting light when a fault occurs in the light-propagating unit 3x so as to prevent the screen 8 from displaying an unexpected video (image) when a faulty light propagation occurs.

In this manner, in the first embodiment of the present invention, a plurality of the light-quantity detecting unit 9x and 10x are arranged on the light path between the light source 1x and the light-modulating unit 6x, and a fault in light propagation is detected based on the result obtained by comparing the difference between the light quantity detection signals DL1, DL2 with the pre-determined difference threshold TDL. Therefore, a fault in the light path can be easily detected.

Because the current IO', which is input to the light source 1x, is controlled based on the comparison result between the light quantity detection signals DL1, DL2 output from the light-quantity detecting units 9x and 10x, display of video can be promptly stopped when a fault occurs in the light path between the light source 1x and the light-modulating unit 6.

Because emission of light from the light source 1x is turned off when a fault is detected in the light path, it can be ensured that video is prevented from being displayed on the screen 8 when a fault occurs in the light path, and power consumed by the light source 1x can be saved.

Furthermore, even if the optical fiber 45 is used for the light-propagating unit 3x, the leakage lights 46 from the optical fiber 45 are detected by the photodiode 17. Therefore, a fault in the light-propagating unit 3x can be easily detected.

A second embodiment of the present invention is explained below with reference to FIGS. 10 to 15. In the second embodiment, when a fault in light propagation is detected in a plurality of light-propagating units 3a, 3b, 3c, a quantity of the light is controlled.

Figure 10:
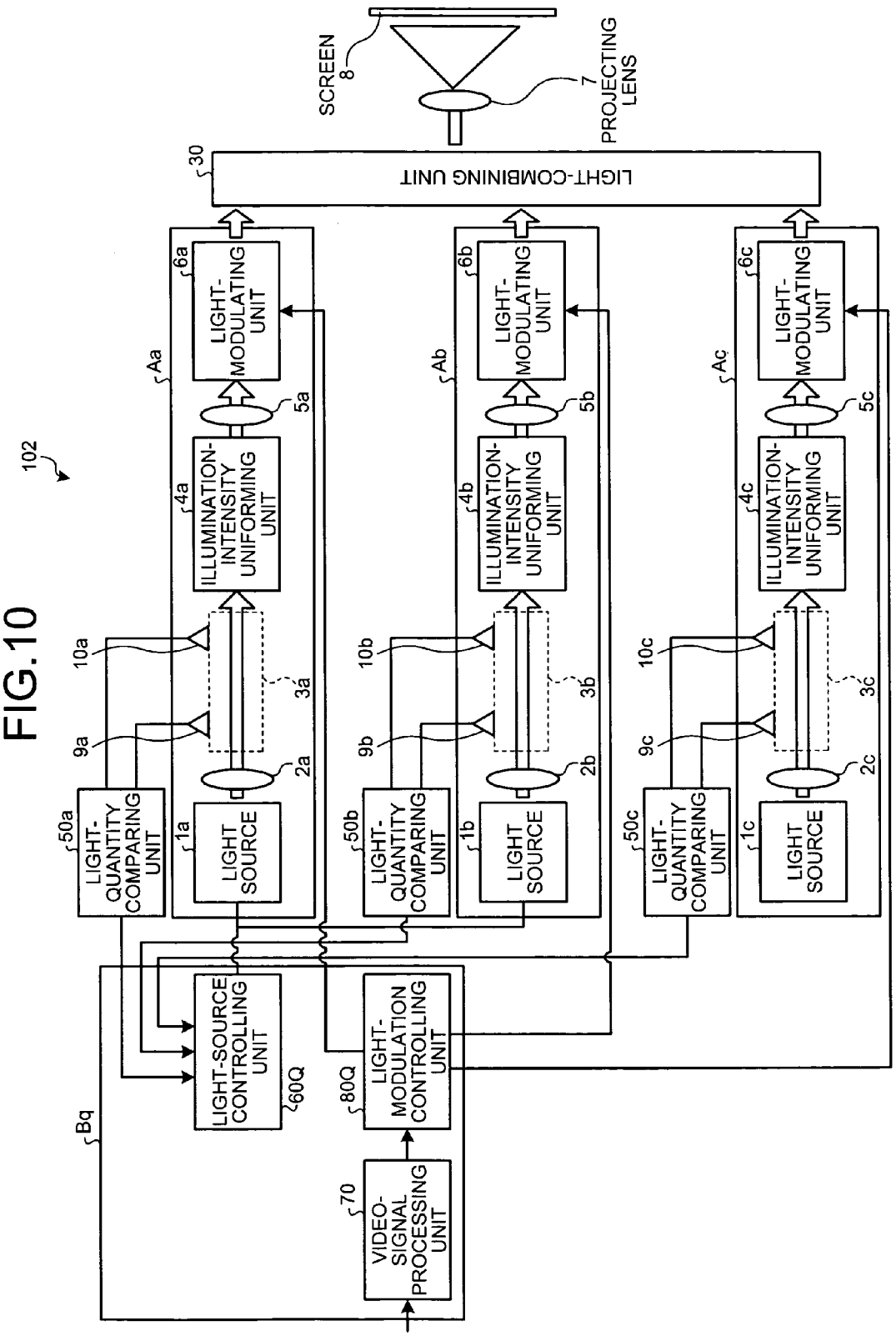
FIG. 10 is a block diagram of an image displaying apparatus according to a second embodiment of the present invention.

FIG. 10 is a block diagram of an image displaying apparatus 102 according to the second embodiment. Elements having the same functions as those according to the first embodiment of the present invention, as shown in FIG. 1, are given the same reference numbers, and redundant explanations thereof are omitted herein.

The image displaying apparatus 102 includes a plurality of optical systems Aa, Ab, and Ac, and a light-combining unit 30 that combines the images generated by each of the optical system Aa, Ab, and Ac. In other words, the image displaying apparatuses 102 is different from image displaying apparatuses 101 in that the former is provided with multiple optical systems Aa, Ab, and Ac between the light source 1x and the light-modulating unit 6x, and that the light-combining unit 30 newly provided to the structure of the image displaying apparatus 101.

As shown in FIG. 10, the image displaying apparatus 102 includes the optical systems Aa, Ab, and Ac, an electrical controlling system Bq, light-quantity comparing units 50a, 50b, 50c, the light-combining unit 30, the projecting lens unit 7, and the screen 8. The electrical controlling system Bq controls the optical systems Aa, Ab, and Ac. The light-quantity comparing units 50a, 50b, 50c compare the quantities of the lights propagating through the optical systems Aa, Ab, and Ac and detect changes thereof. The light-combining unit 30 combines the images generated by light-modulating unit 6a, 6b, 6c, and transmits the combined image to the projecting lens unit 7.

The optical system Aa includes a light source 1a, a collecting lens 2a, a light-propagating unit 3a, an illumination-intensity uniforming unit 4a, a relay lens 5a, and the light-modulating unit 6a. The optical system Ab includes a light source 1b, a collecting lens 2b, a light-propagating unit 3b, an illumination-intensity uniforming unit 4b, a relay lens 5b, and a light-modulating unit 6b. The optical system Ac includes a light source 1c, a collecting lens 2c, a light-propagating unit 3c, an illumination-intensity uniforming unit 4c, a relay lens 5c, and a light-modulating unit 6c.

The light sources 1a, 1b, 1c have the same function as the light source 1x, and the collecting lenses 2a, 2b, 2c have the same function as the collecting lens 2x. The light-propagating units 3a, 3b, 3c have the same function as the light-propagating units 3x, and the illumination-intensity uniforming units 4a, 4b, 4c have the same function as the illumination-intensity uniforming unit 4x. The relay lenses 5a, 5b, 5c have the same function as the relay lens 5x, and the light-modulating units 6a, 6b, 6c have the same function as the light-modulating unit 6x. The light-quantity comparing units 50a, 50b, 50c have the same function as the light-quantity comparing unit 50x.

The electrical controlling system Bq includes a light-source controlling unit 60Q, the video-signal processing unit 70, and a light-modulation controlling unit 80Q. The light-source controlling unit 60Q has the same function as the light-source controlling unit 60P, and is connected to the light-quantity comparing unit 50a, 50b, 50c. The light-modulation controlling unit 80Q has the same function as the light-modulation controlling unit 80P, and is connected to the light-modulating unit 6a, 6b, 6c. It is not necessary to connect the light-modulation controlling unit 80Q to each light source 1a, 1b, 1c.

For example, each light source 1a, 1b, 1c in the image displaying apparatus 102 includes light emitting diodes (LED) of red, green, and blue, respectively, each emitting light of different wavelength. The red Light propagates through the optical system Aa, and it is modulated in the light-modulating unit 6a. The blue light propagates through the optical system Ab, and it is modulated in the light-modulating unit 6b, and the green light propagates through the optical system Ac, and it is modulated in the light-modulating unit 6c.

Figure 11:
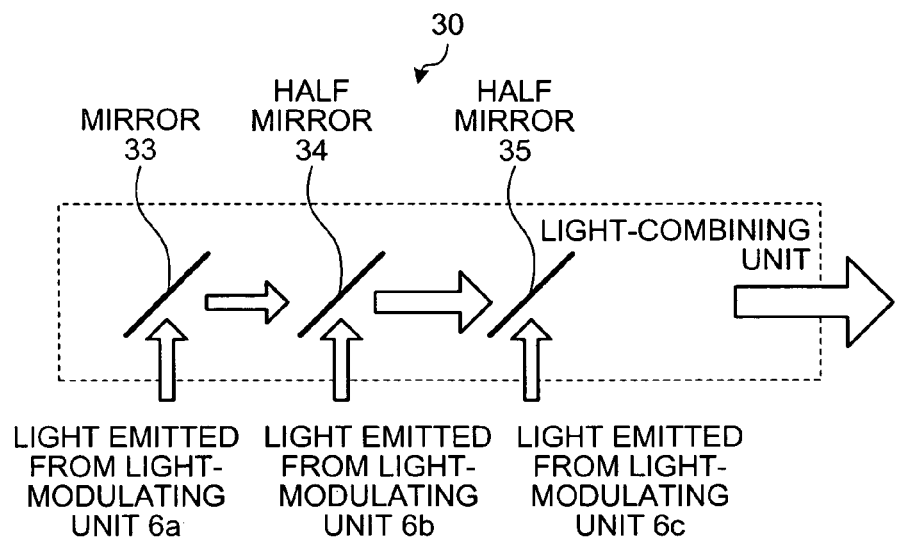
FIG. 11 is a schematic of a structure of a light-combining unit shown in FIG. 10.

A structure of the light-combining unit 30 is described in detail below. FIG. 11 is a schematic of the light-combining unit 30. The light-combining unit 30 includes a mirror 33, a half mirror 34, and another half mirror 35. The light axis of the red light ejected from the optical system Aa (the light-modulating unit 6a) is inflected at the mirror 33. Subsequently, the red light is superimposed with the blue light ejected from the optical system Ab (the light-modulating unit 6b) at the half mirror 34. The combined lights of the red and the blue are superimposed with the green light ejected from the optical system Ac (the light-modulating unit 6c) at the half mirror 35, and ejected to the projecting lens unit 7.

Figure 12:
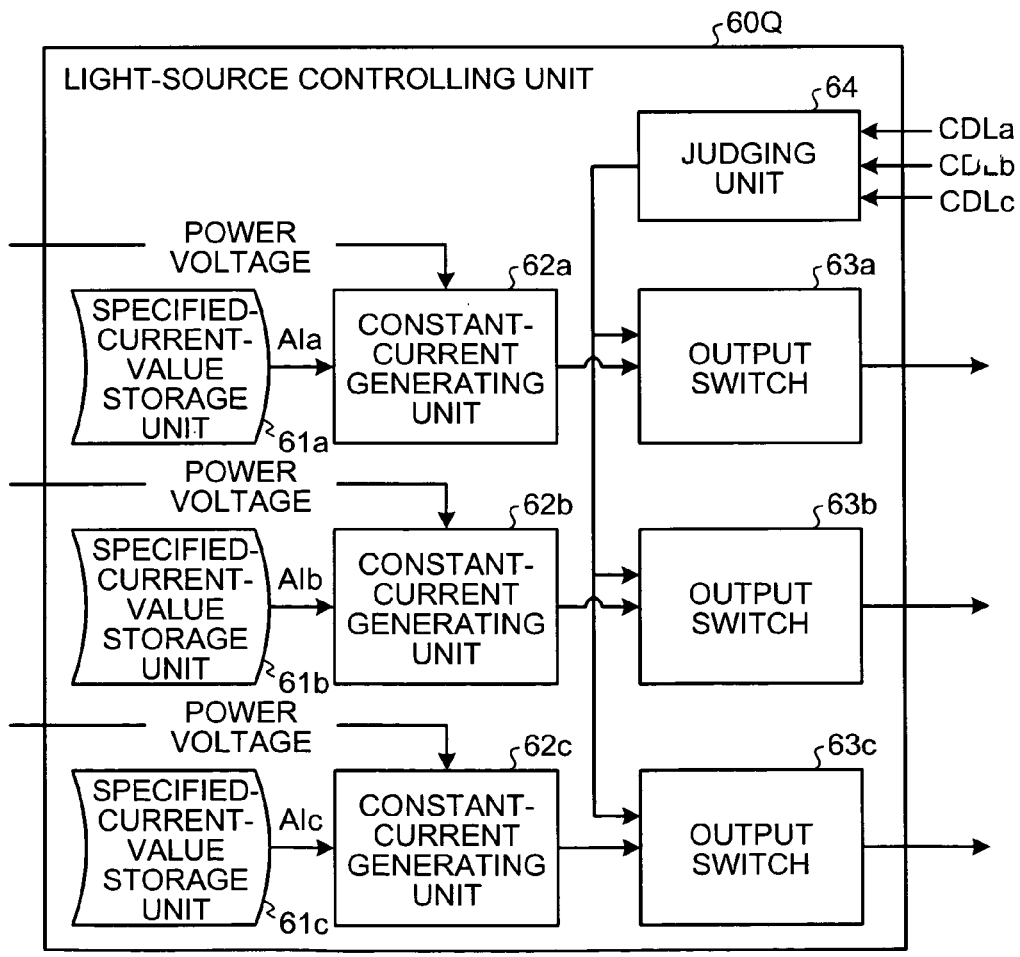
FIG. 12 is a schematic of a light source-controlling unit shown in FIG. 10.

A structure of the light-source controlling unit 60Q is explained below. FIG. 12 is a block diagram of the light-source controlling unit 60Q. The light-source controlling unit 60Q includes a plurality of specified-current-value storage units 61a, 61b, 61c, a plurality of constant-current generating units 62a, 62b, 62c, a plurality of output switches 63a, 63b, 63c, and a judging unit 64.

The light-source controlling unit 60Q is different from the light-source controlling unit 60P in that the former includes a multiple pairs of the specified-current-value storage units, constant-current generating units, and output switches. Furthermore, a plurality of control signals CDLa, CDLb, CDLc output from the light-quantity comparing units 50a, 50b, 50c are input to the judging unit 64, and the outputs of the judging unit 64 are respectively connected to the output switches 63a, 63b, 63c. The other elements of the light-source controlling unit 60Q are the same as the light-source controlling unit 60P according to the first embodiment of the present invention as shown in FIG. 8; therefore, detailed explanations thereof are omitted herein.

The specified-current-value storage units 61a, 61b, 61c have the same function as the specified-current-value storage unit 61x. The constant-current generating unit 62a, 62b, 62c have the same function as the constant-current generating unit 62x, and the output switches 63a, 63b, 63c have the same function as the output switch 63x.

Each output switch 63a, 63b, 63c is connected to each constant-current generating unit 62a, 62b, 62c and to the judging unit 64, as well as to each light source 1a, 1b, 1c, respectively. The judging unit 64 is connected to the light-quantity comparing units 50a, 50b, 50c, and input with the control signals CDLa, CDLb, CDLc, each of which is output from each light-quantity comparing unit 50a, 50b, 50c.

An output of the output switch 63a is connected to the red light source 1a, an output of the output switch 63b is connected to the blue light source 1b, and an output of the output switch 63c is connected to the green light source 1c. Each output switch 63a, 63b, 63c supplies a power to the LED, which is the light source in each light source 1a, 1b, 1c.

For example, if any one of the control signals CDLa, CDLb, CDLc output from the light-quantity comparing units 50a, 50b, 50c is "0", then the judging unit 64 sends a control signal "0" to each output switch 63a, 63b, 63c. When a control signal "0" is received, each output switch 63a, 63b, 63c stops supplying a power to the light sources 1a, 1b, 1c, respectively, turning of all of the lights emitted from the light sources 1a, 1b, 1c.

In the second embodiment, each light source 1a, 1b, 1c includes a LED of red, blue, or green, respectively. Therefore, it is not necessary to provide a color wheel in each of the light sources 1a, 1b, 1c. Other types of light sources, such as a semiconductor laser, may also be used to achieve the same advantages as the LED. Furthermore, the number of light source is not limited to three; two light sources, or four or more light sources may also be used to achieve the same advantages as three light sources.

In the second embodiment, each optical system Aa, Ab, and Ac include the illumination-intensity uniforming unit 4a, 4b, 4c, the relay lens 5a, 5b, 5c, and the light-modulating unit 6a, 6b, 6c. However, the optical system Aa, Ab, and Ac may also be structured in other ways.

Figure 13:
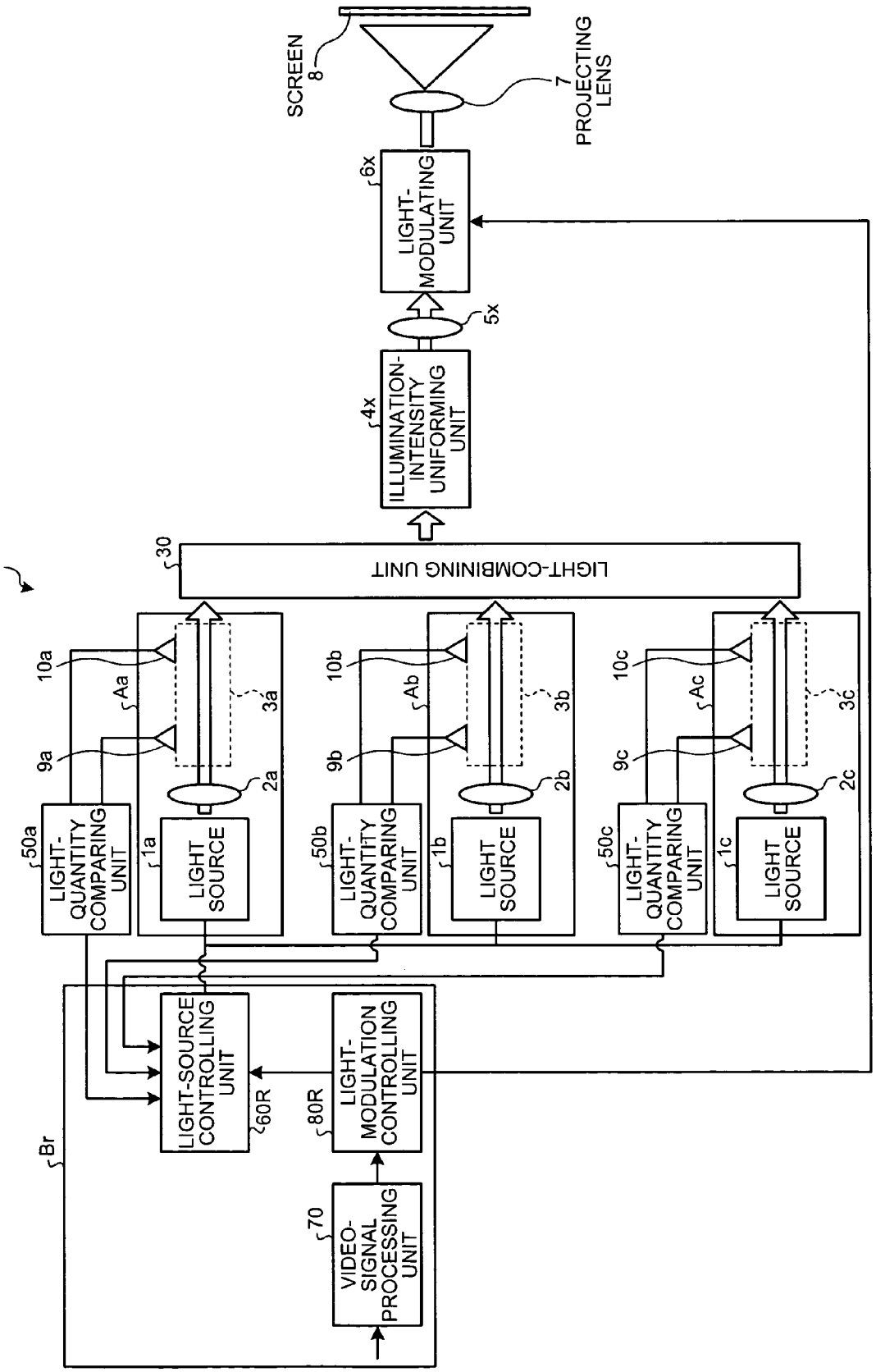
FIG. 13 is a block diagram of an alternative structure of the image displaying apparatus according to the second embodiment.

FIG. 13 is a block diagram of an alternative structure of the image displaying apparatus 103. Elements having the same functions as the image displaying apparatus 102 shown in FIG. 10, or the image displaying apparatus 101 shown in FIG. 1 are given the same reference numbers, and redundant explanations thereof are omitted herein.

As shown in FIG. 13, in the alternative structure, the image displaying apparatus 103 includes the optical systems Aa, Ab, and Ac, an electrical controlling system Br, the light-quantity comparing units 50a, 50b, 50c, the light-combining unit 30, the illumination-intensity uniforming unit 4x, the relay lens 5x, the light-modulating unit 6x, the projecting lens unit 7, and the screen 8.

The optical system Aa includes the light source 1a, the collecting lens 2a, and the light-propagating unit 3a. The optical system Ab includes the light source 1b, the collecting lens 2b, and the light-propagating unit 3b. The optical system Ac includes the light source 1c, the collecting lens 2c, and the light-propagating unit 3c.

In the image displaying apparatus 103, the light-propagating unit 3a, 3b, 3c in the optical systems Aa, Ab, and Ac are connected to the light-combining unit 30, and the light-combining unit 30 is connected to the illumination-intensity uniforming unit 4x. The electrical controlling system Br includes a light-source controlling unit 60R, the video-signal processing unit 70, and a light-modulation controlling unit 80R. The light-modulation controlling unit 80R has the same function as the light-modulation controlling units 80P, 80Q, and is connected to the light-modulating unit 6x and the light-source controlling unit 60R.

The image displaying apparatus 103 is different from the image displaying apparatus 102 in that the lights emitted from the light sources 1a, 1b, 1c propagate through the collecting lenses 2a, 2b, 2c and the light-propagating units 3a, 3b, 3c to the light-combining unit 30 and combined to a white color in the light-combining unit 30, and the processes including uniforming the illumination intensity are performed subsequently; and timing signal is sent from the light-modulation controlling unit 80R to the light-source controlling unit 60R.

Figure 14:
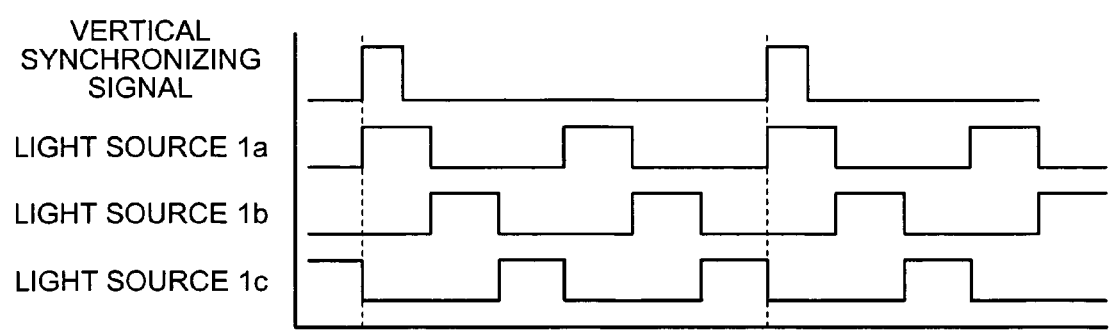
FIG. 14 is a timing chart of light emission timing from each light source shown in FIG. 13.

Timing for emitting the light from each light source 1a, 1b, 1c is explained in detail below. FIG. 14 is a timing chart of each light source 1a, 1b, 1c being turned on twice per frame. Based on a vertical synchronizing signal, light is emitted from each light source (LED) sequentially in the order of the light source 1a, the light source 1b, and the light source 1c. When only one light-modulating unit 6x is provided, the light of each color is emitted by way of the time sharing, in the same manner as in the image displaying apparatus 101 according to the first embodiment of the present invention, and injected to and modulated by the light-modulating unit 6x.

In other words, when there is only one light-modulating unit 6x but are multiple light sources 1a, 1b, 1c corresponding to each color, it is necessary to control each of the light source 1a, 1b, 1c so as to emit the light with an offset timing. To turn on the light source 1a, 1b, 1c according to the timing at which a specific color is modulated by the light-modulating unit 6x, the light-source controlling unit 60R uses a timing signal received from the light-modulation controlling unit 80R to control each of the light source 1a, 1b, 1c.

Figure 15:
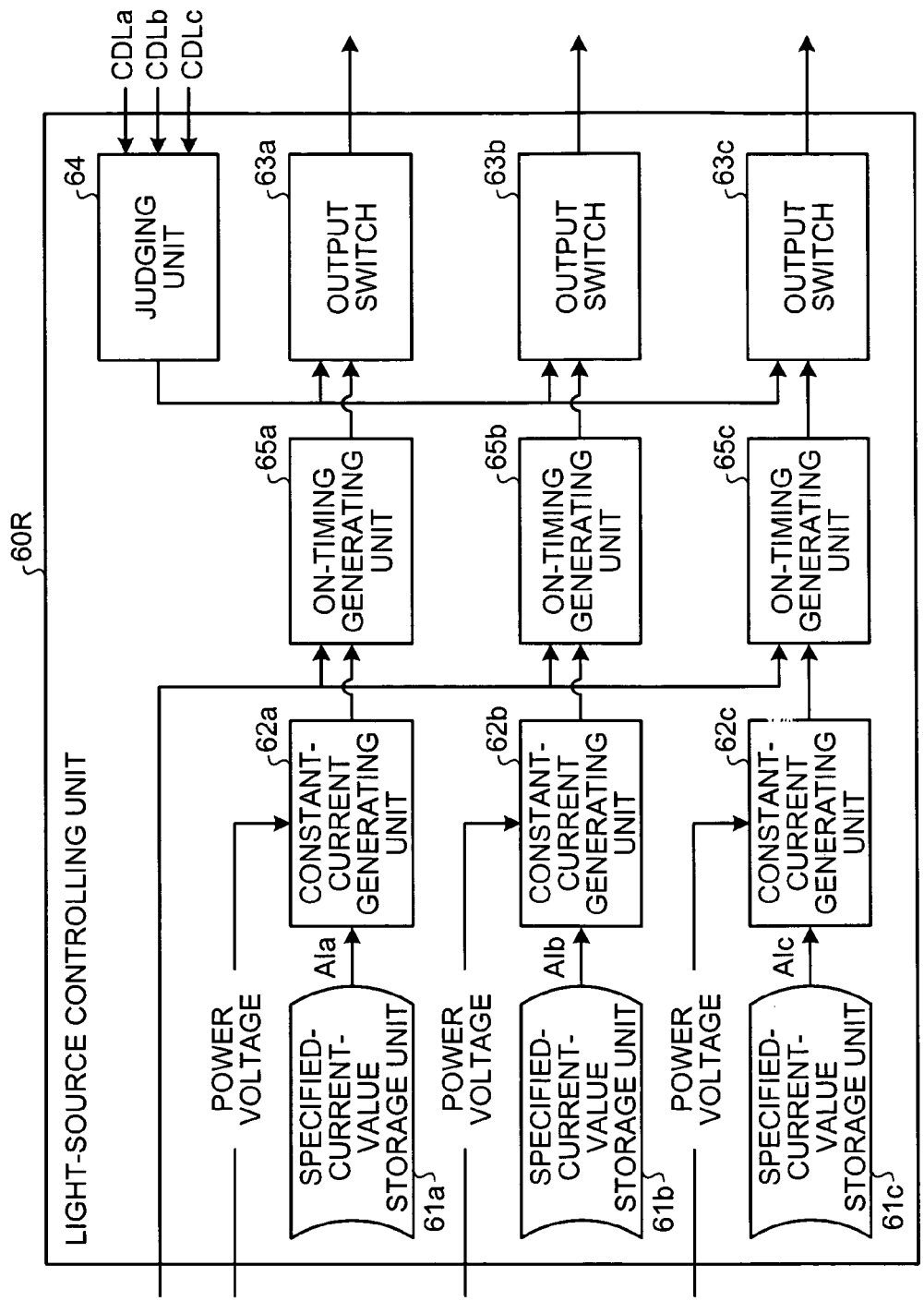
FIG. 15 is a schematic of an alternative structure of the light source-controlling unit according to the second embodiment.

A structure of the light-source controlling unit 60R is explained in detail below. FIG. 15 is a diagram of an alternative structure of the light-source controlling unit 60R. The light-source controlling unit 60R includes the specified-current-value storage units 61a, 61b, 61c, the constant-current generating unit 62a, 62b, 62c, the output switches 63a, 63b, 63c, the judging unit 64, and ON-timing generating unit 65a, 65b, 65c.

In the light-source controlling unit 60R, each of the constant-current generating unit 62a, 62b, 62c is connected to each of the output switches 63a, 63b, 63c, via each of the ON-timing generating units 65a, 65b, 65c. The ON-timing generating units 65a, 65b, 65c receive a timing signal CT' transmitted from the light-modulation controlling unit 80R.

The light-source controlling unit 60R is different from the light-source controlling unit 60Q in that the former is input with the timing signals CT' output from the light-modulation controlling unit 80R, and includes the ON-timing generating units 65a, 65b, 65c. The ON-timing generating units 65a, 65b, 65c control the timing for outputting the current generated by the constant-current generating units 62a, 62b, 62c to the output switches 63a, 63b, 63c, based on the timing signal CT' received from the light-modulation controlling unit 80R. In this manner, even if the image displaying apparatus 103 has the multiple light sources 1a, 1b, 1c and the single light-modulating unit 6x, an fault in the light path can be easily detected.

In the second embodiment, the light-quantity comparing units 50a, 50b, 50c are provided for each light-propagating unit 3a, 3b, 3c, however, it is also possible to provide only one light-quantity comparing unit 50x having the functions of the light-quantity comparing units 50a, 50b, 50c. Upon doing so, the single light-quantity comparing unit 50x determines from which light-propagating unit, 3a, 3b, or 3c the light quantity detection signal DL is received based on the timing signal CT' received from the light-modulation controlling unit 80R, and detects a fault in the light path in each of the light-propagating unit 3a, 3b, 3c.

In this manner, in the second embodiment, each light-quantity comparing unit 50a, 50b, 50c detects a fault in a corresponding light path provided for each light source 1a, 1b, 1c (such as the light-propagating unit 3a, 3b, 3c). Therefore, a faulty light propagation can be easily detected even when the image displaying apparatus is provided with multiple light-propagating units 3a, 3b, 3c.

Furthermore, all light source 1a, 1b, 1c can be controlled to stop emitting light when a faulty light propagation occurs in the light-propagating units 3a, 3b, 3c. Therefore, the screen 8 can be prevented from displaying an unexpected video when a faulty light propagation occurs.

Figure 17:
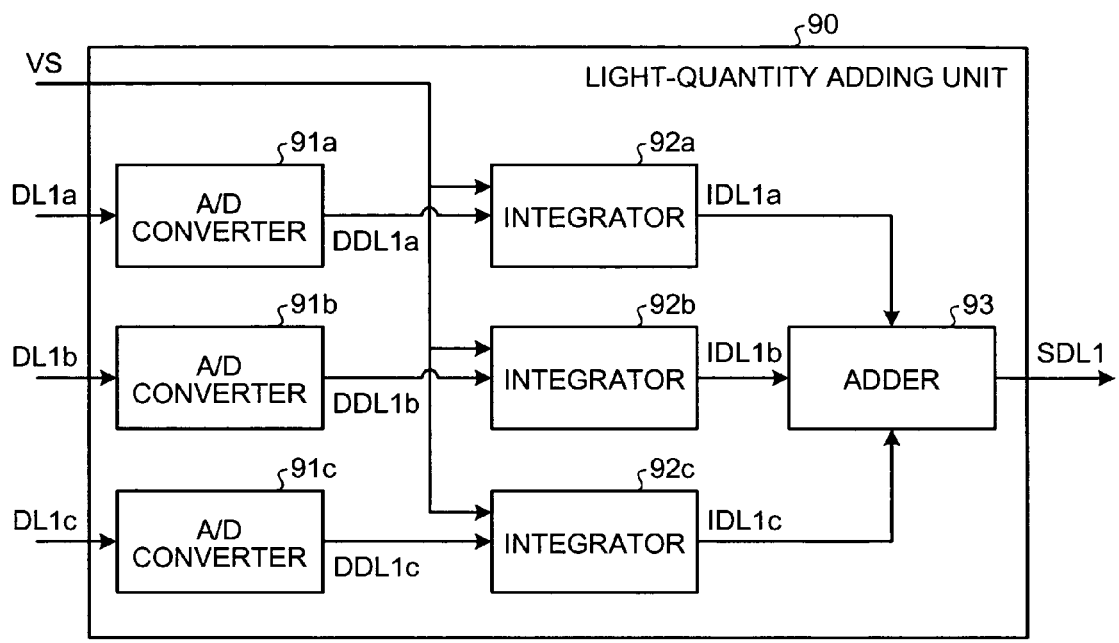
FIG. 17 is a block diagram of an internal structure of a light quantity-adder shown in FIG. 16.
Figure 18:
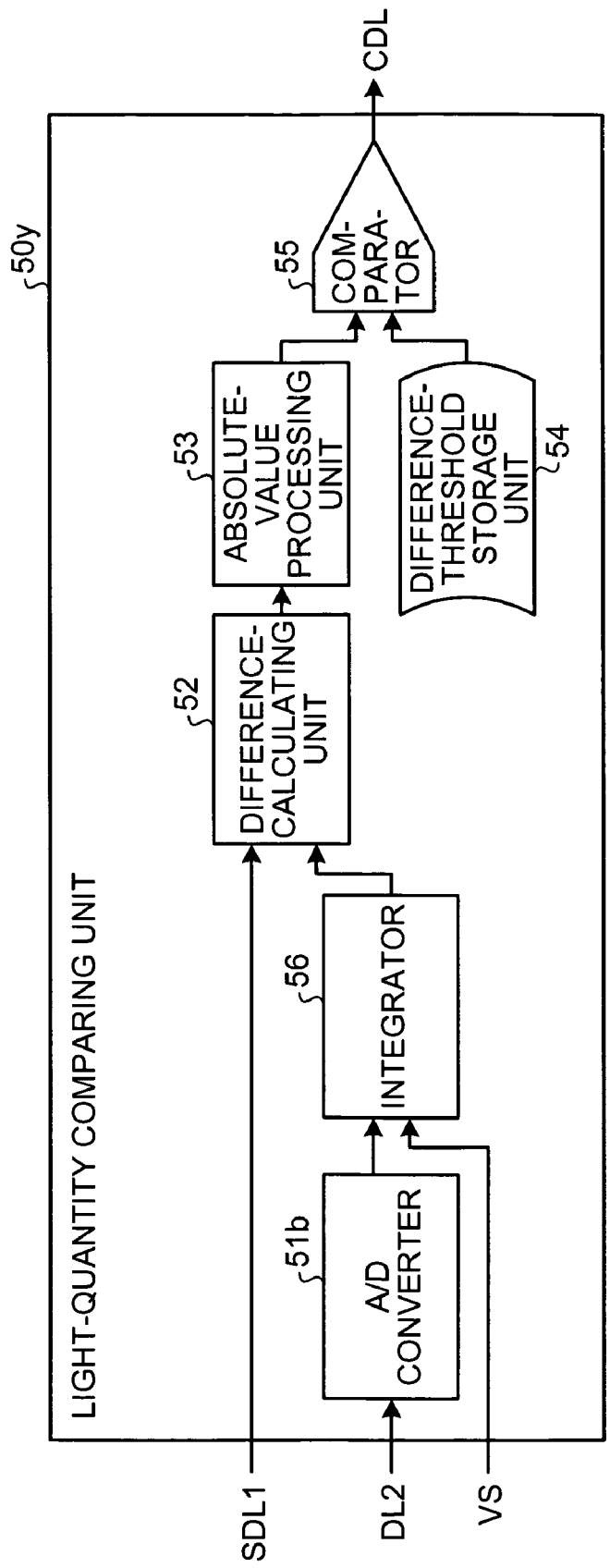
FIG. 18 is a detailed block diagram of a light-quantity comparing unit shown in FIG. 16.

A third embodiment of the present invention is explained below with reference to FIGS. 16 to 18. In the third embodiment, a faulty light propagation is detected by using a quantity of the white light after the lights emitted from the light sources 1a, 1b, 1c are combined.

Figure 16:
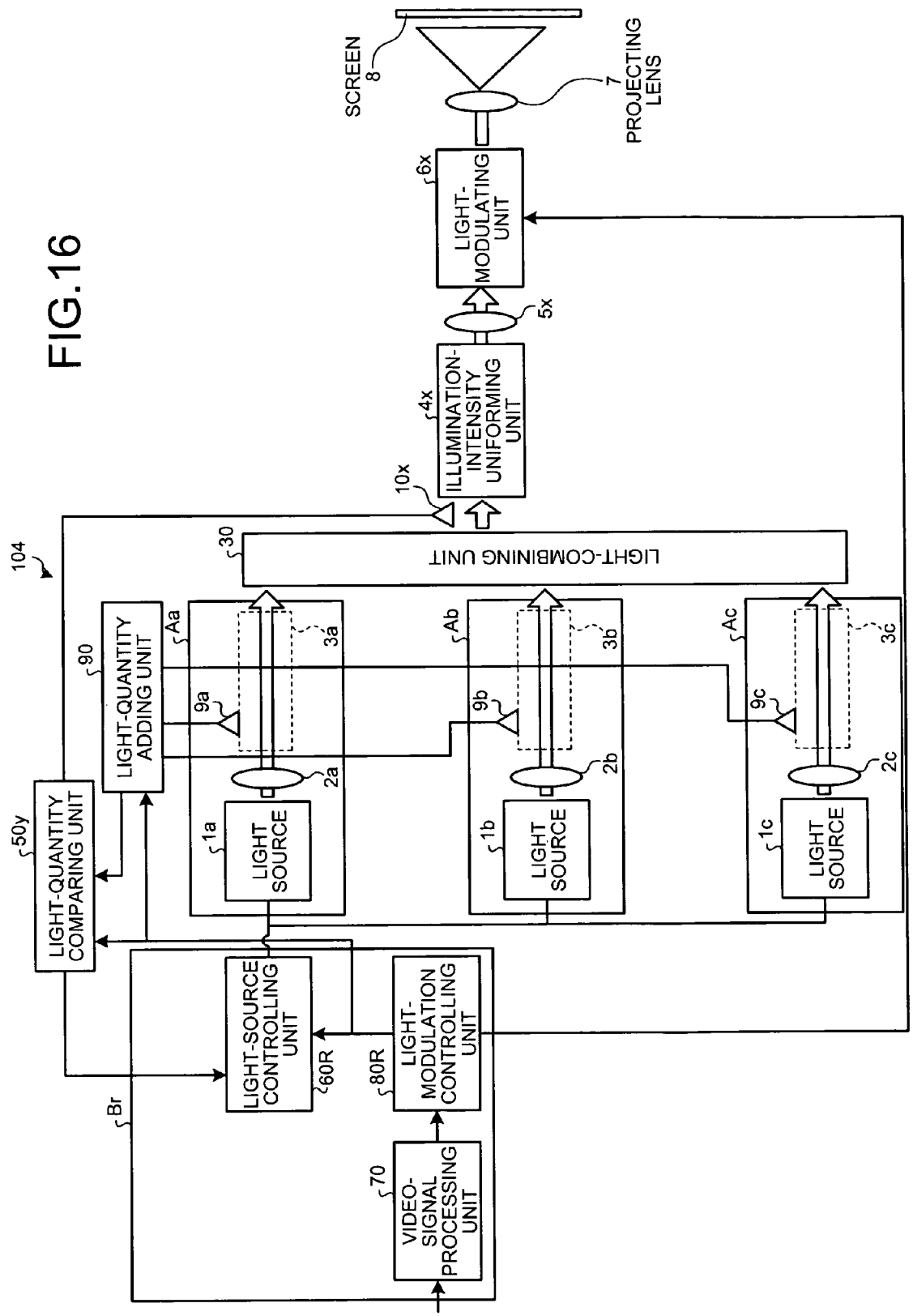
FIG. 16 is a schematic of an image displaying apparatus according to a third embodiment of the present invention.

FIG. 16 is a block diagram of an image displaying apparatus 104 according to the third embodiment. In FIG. 16, elements having the same functions as in the image displaying apparatus 101 according to the first embodiment of the present invention, as shown in FIG. 1, or as in the image displaying apparatus 102, 103 according to the second embodiment of the present invention, as shown in FIGS. 10 and 13, are given the same reference numbers, and redundant explanations thereof are omitted herein.

The image displaying apparatus 104 is different from the image displaying apparatus 103 according to the second embodiment in that the former is provided with the light-quantity detecting unit 10x between the light-combining unit 30 and the illumination-intensity uniforming unit 4x; the multiple light-quantity comparing units 50a, 50b, 50c of the image displaying apparatus 103 is integrated into a single unit; and the former is further provided with a light-quantity adder 90.

As shown in FIG. 16, the image displaying apparatus 104 includes the optical systems Aa, Ab, and Ac, the electrical controlling system Br, a light-quantity comparing unit 50y, the light-quantity adder 90, the light-combining unit 30, the illumination-intensity uniforming unit 4x, the relay lens 5x, the light-modulating unit 6x, the light-quantity detecting unit 10x, the projecting lens unit 7, and the screen 8. In the third embodiment, the light-propagating units 3a, 3b, 3c is provided with light-quantity detecting units 9a, 9b, 9c, respectively. The light-quantity detecting unit 10x is positioned (on the light path) between the light-combining unit 30 and the illumination-intensity uniforming unit 4x.

The light-quantity adder 90 is connected to the light-quantity detecting units 9a, 9b, 9c, the light-quantity comparing unit 50y, and the light-modulation controlling unit 80R. The light-quantity comparing unit 50y is connected to the light-quantity detecting unit 10x, the light-quantity adder 90, the light-modulation controlling unit 80R, and the light-source controlling unit 60R. The light-modulation controlling unit 80R in the electrical controlling system Br is connected to the light-modulating unit 6x, the light-source controlling unit 60R, the light-quantity comparing unit 50y, the light-quantity adder 90.

The light-quantity adder 90 calculates a sum of light quantity detection signals DL1a, DL1b, DL1c, which are output from the light-quantity detecting units 9a, 9b, 9c, based on a timing signal VS output from the light-modulation controlling unit 80R, and outputs the sum SDL1 to the light-quantity comparing unit 50y.

The light-quantity comparing unit 50y compares the sum SDL1 received from the light-quantity adder 90 with the light quantity detection signal DL2 received from the light-quantity detecting unit 10x, and outputs a control signal CDL to the light-source controlling unit 60P based on the comparison result.

A detailed structure of the light-quantity adder 90 is explained below. FIG. 17 is a block diagram of the light-quantity adder 90. The light-quantity adder 90 includes a plurality of A/D converters 91a, 91b, 91c, a plurality of integrators 92a, 92b, 92c, and an adder 93. The integrators 92a, 92b, 92c are connected to the A/D converters 91a, 91b, 91c, respectively, as well as to the light-modulation controlling unit 80R and the adder 93. The adder 93 is connected to the light-quantity comparing unit 50y.

The light quantity detection signal DL1a is output from the light-quantity detecting unit 9a, and input to the A/D converter 36a. In the same manner, the light quantity detection signals DL1b, DL1c are output from the light-quantity detecting units 9b, 9c, and input to the A/D converters 36b, 36c, respectively. The timing signal VS output from the light-modulation controlling unit 80R is input to the integrators 92a, 92b, 92c.

The A/D converter 91a, 91b, 91c convert the light quantity detection signals DL1a, DL1b, DL1c into digital signals DDL1a, DDL1b, DDL1c, and input the digital signals DDL1a, DDL1b, DDL1c to the integrators 92a, 92b, 92c.

The integrator 92a calculates a time integration of the digital light quantity detection signal DDL1a for every cycle of the timing signal VS output from the light-modulation controlling unit 80R to obtain a detected light quantity IDL1a. The integrator 92a then outputs the detected light quantity IDL1a to the adder 93. In the same manner, the integrators 92b, 92c respectively calculate time integrations of the digital light quantity detection signals DDL1b, DDL1c for every cycle of the timing signal VS output from the light-modulation controlling unit 80R to obtain detected light quantities IDL1b, IDL1c. The integrators 92b, 92c then output the detected light quantities IDL1b, IDL1c to the adder 93.

The adder 93 calculates a sum of each detected light quantity IDL1a, IDL1b, IDL1c, which the integrators 92a, 92b, 92c obtained by calculating the time integration, to obtain a detected light quantity SDL1. The adder 93 then outputs the detected light quantity SDL1 to the light-quantity comparing unit 50y.

A structure of the light-quantity comparing unit 50y is described in detail below. FIG. 18 is a block diagram of the light-quantity comparing unit 50y. In FIG. 18, elements having the same functions as in the light-quantity comparing unit 50x according to the first embodiment of the present invention, as shown in FIG. 5, are given the same reference numbers, and redundant explanations thereof are omitted herein.

The light-quantity comparing unit 50y includes the A/D converter 51b, an integrator 56, the difference-calculating unit 52, the absolute-value processing unit 53, the difference-threshold storage unit 54, and the comparator 55. The difference-calculating unit 52 is connected to the light-quantity adder 90 (the adder 93), and the A/D converter 51b is connected to the light-quantity detecting unit 10x. The integrator 56 is connected to the light-modulation controlling unit 80R. The A/D converter 51b is also connected to the integrator 56, and the integrator 56 is connected to the difference-calculating unit 52.

The light-quantity comparing unit 50y is different from the light-quantity comparing unit 50x shown in FIG. 5 in that the former has only one A/D converter 51b, and has the additional integrator 56.

The light quantity detection signal DL2 is output from the light-quantity detecting unit 10x, and input to the A/D converter 51b. The detected light quantity SDL1 output from the light-quantity adder 90 is input to the difference-calculating unit 52.

The A/D converter 51b converts the light quantity detection signal DL2 into a digital light quantity detection signal DDL2, and outputs the digital light quantity detection signal DDL2 to the integrator 56. The integrator 56 calculates a time integration of the digital light quantity detection signal DDL2 for every cycle of the timing signal VS output from the light-modulation controlling unit 80R to obtain a detected light quantity IDL2. The integrator 56 then outputs the obtained detected light quantity IDL2 to the difference-calculating unit 52.

The difference-calculating unit 52 calculates the difference between the detected light quantity IDL2 received from the integrator 56 and the detected light quantity SDL1 received from light-quantity adder 90, and sends the calculated difference to the absolute-value processing unit 53. The absolute-value processing unit 53 takes an absolute value of the difference received from the difference-calculating unit 52, and outputs the absolute value to the comparator 55.

In the third embodiment, the light-quantity detecting unit 10x is arranged between the light-combining unit 30 and the illumination-intensity uniforming unit 4x. However, the light-quantity detecting unit 10x can be arranged anywhere between the light-combining unit 30 and the light-modulating unit 6x. For example, the light-quantity detecting unit 10x can be arranged between the relay lens 5x and the light-modulating unit 6x. Such an arrangement has the same advantage as that having the light-quantity detecting unit 10 between the light-combining unit 30 and the illumination-intensity uniforming unit 4x. Furthermore, the light-quantity detecting units 9a, 9b, 9c can be provided anywhere in the light-propagating units 3a, 3b, 3c.

In the third embodiment, only one light-quantity detecting unit 10x is provided on the light path. However, a plurality of light-quantity detecting units 10a, 10b, 10c may also be provided as shown in the image displaying apparatuses 102, 103 according to the second embodiment of the present invention, as shown in FIGS. 10 and 13. In such an arrangement, the light quantity detection signals output from the light-quantity detecting units 10a, 10b, 10c may be added based on the timing signal VS output from the light-modulation controlling unit 80R, and the sum may be output to the light-quantity comparing unit 50y.

In this manner, according to the third embodiment of the present invention, the quantities of the lights detected at multiple points are compared after the time integration is calculated based on the timing provided to control the light-modulating unit 6x. Therefore, even when multiple light sources 1a, 1b, 1c are sequentially turned on by time sharing and only one light-modulating unit 6x is provided, a faulty light propagation can be easily detected.

Furthermore, all light source 1a, 1b, 1c can be controlled to stop emitting light when a faulty light propagation occurs in the light-propagating units 3a, 3b, 3c. Therefore, the screen 8 can be prevented from displaying an unexpected video when a faulty light propagation occurs.

Furthermore, the light-quantity comparing unit 50y compares the sum of the outputs from the multiple light-quantity detecting units 9a, 9b, 9c calculated by the light-quantity adder 90, with the result detected by the light-quantity detecting unit 10x detecting the quantity of light after the lights from the light sources 1a, 1b, 1c are combined into a white light. Therefore, the number of light-quantity detecting units and the light-quantity comparing units can be reduced, further allowing easy detection of a faulty light propagation with a simple structure.

Because the light-quantity detecting unit 10x is positioned closer to the illumination-intensity uniforming unit 4x than the light-combining unit 30, a fault in the light path including the section between the light-combining unit 30 and the illumination-intensity uniforming unit 4x can be detected.

A forth embodiment of the present invention is described below with reference to FIGS. 19 and 20. According to the forth embodiment, a shutter is provided so as to shut out the light from the light source 1x when a fault occurs in light propagation.

Figure 19:
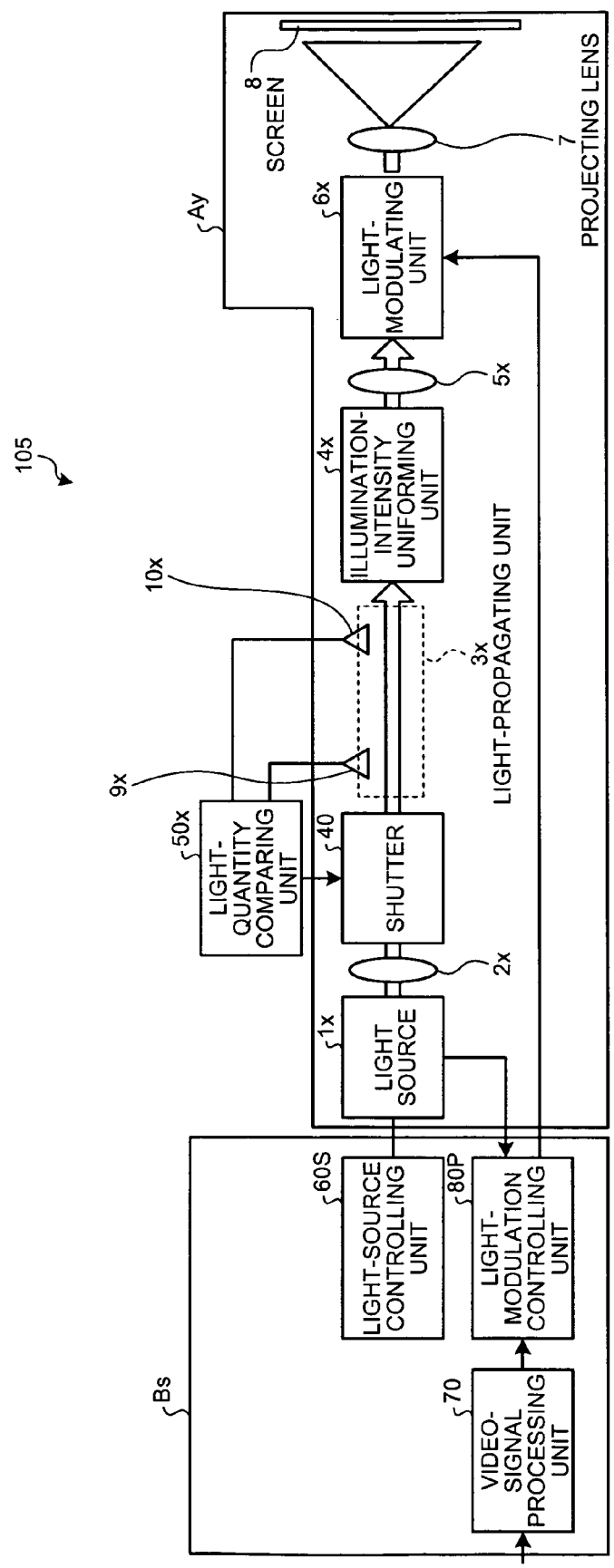
FIG. 19 is a schematic of an image displaying apparatus according to a forth embodiment of the present invention.
Figure 20:
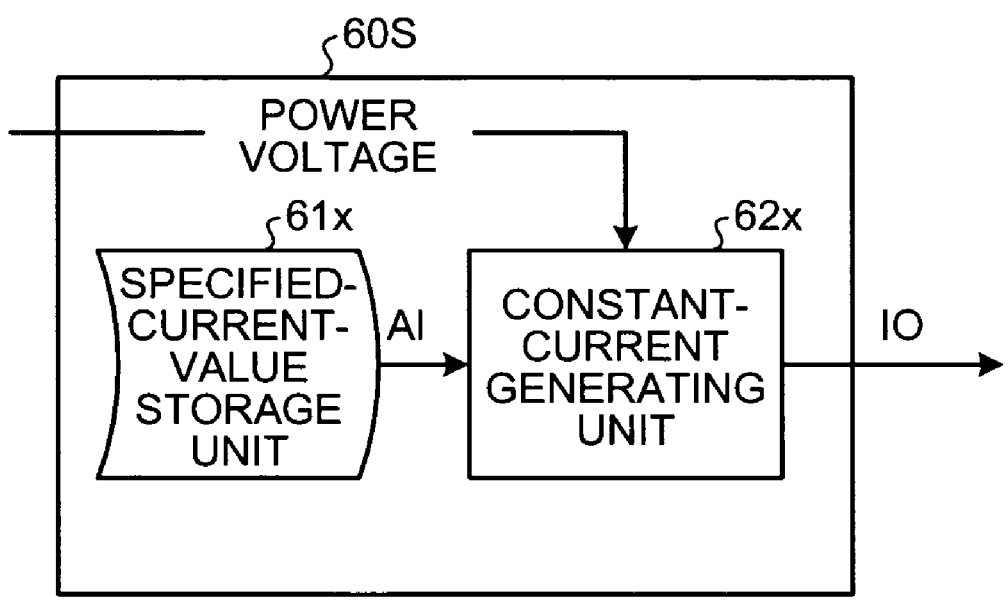
FIG. 20 is a schematic of a light-source controlling unit shown in FIG. 19.

FIG. 19 is a block diagram of an image displaying apparatus 105 according to the forth embodiment. Elements having the same functions as those in the image displaying apparatus 101 according to the first embodiment of the present invention, as shown in FIG. 1, are given the same reference numbers, and redundant explanations thereof are omitted herein.

The image displaying apparatus 105 includes the optical system Ay, an electrical controlling system Bs, and the light-quantity comparing unit 50x. The optical system Ay includes the light source 1x, the collecting lens 2x, the light-propagating unit 3x, the illumination-intensity uniforming unit 4x, the relay lens 5x, the light-modulating unit 6x, the projecting lens unit 7, the screen 8, and a shutter 40. According to the forth embodiment of the present invention, the light emitted from the light source 1x passes through the collecting lens 2x, the shutter 40, and the light-propagating unit 3x and reaches the illumination-intensity uniforming unit 4x.

The electrical controlling system Bs includes a light-source controlling unit 60S, the video-signal processing unit 70, the light-modulation controlling unit 80P. The light-source controlling unit 60S is connected to the light source 1x, and the light-modulation controlling unit 80P is connected to the light source 1x and the light-modulating unit 6x. The light-quantity comparing unit 50x is connected to the light-quantity detecting units 9x and 10x, and the shutter 40.

The image displaying apparatus 105 is different from the image displaying apparatus 101 in that the former is provided with the shutter 40 right after the collecting unit 2x (between the collecting lens 2x and the light-propagating unit 3x) (in the beginning of the light-propagating unit 3x).

The shutter 40 includes a shutter mechanism for shutting out light. If the shutter mechanism is in an open state, the light emitted from the light source 1x is passed through and reaches the light-propagating unit 3x. If the shutter mechanism is in a closed state, the light emitted from the light source 1x is shut out, so that the light does not reach the light-propagating unit 3x. The shutter 40 is controlled so as to open and close the shutter mechanism based on the control signal CDL output from the light-quantity detecting units 9x and 10x.

A structure of the light-source controlling unit 60S is described in detail below. FIG. 20 is a block diagram of the light-source controlling unit 60S. The light-source controlling unit 60S includes the specified-current-value storage unit 61x and the constant-current generating unit 62x.

The specified-current-value storage unit 61x is a storage, such as a memory, that stores therein the specified current value AI. The constant-current generating unit 62x outputs the current IO corresponding to the specified current value AI, which is stored in the specified-current-value storage unit 61x, from an external power supply to the light source 1x.

An operation of the image displaying apparatus 105 is described below. Redundant explanations are omitted below for the same steps as those performed by the image displaying apparatus 101.

The light emitted from the light source 1x passes through the collecting lens 2x, and is injected to the shutter 40. The shutter 40 is controlled so as to open and close the shutter mechanism based on the control signal CDL output from the light-quantity comparing unit 50x. Specifically, if the control signal CDL output from the light-quantity comparing unit 50x is "1", then the shutter mechanism is kept open. If the control signal CDL output from the light-quantity comparing unit 50x is "0", then the shutter mechanism is closed.

When the control signal CDL is "1", because the shutter mechanism in the shutter 40 is kept open, the light emitted from the light source 1x passes through the shutter 40 and the light-propagating unit 3x, and reaches the illumination-intensity uniforming unit 4x.

When the control signal CDL is "0", because the shutter mechanism in the shutter 40 is closed, the light emitted from the light source 1x is shut out by the shutter 40, and does not reach the light-propagating unit 3x.

In the forth embodiment, the light source 1x (a light source having the lamp 11 and the color wheel 12) is used as a light source. However, this method for shutting out the light using the shutter 40 may also be applied to the light sources 1a, 1b, 1c (the light sources using multiple LEDs or lasers) explained for the second and the third embodiments of the present invention.

As explained above, according to the forth embodiment, the shutter 40 is provided to shut out the light emitted from the light source 1x when a faulty light propagation occurs. Therefore, the light from the light source 1x can be shut out easily and reliably to prevent the screen 8 from displaying an unexpected video (image) when a faulty light propagation occurs.

According to an aspect of the present invention, when the quantity of the light propagating through the light path exceeds a predetermined quantity, the quantity of light transmitted to the screen is controlled. Therefore, the fault in the light path can be detected, and the image can be easily displayed according to the condition of the image displaying apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image displaying apparatus that spatially modulates light emitted from a light source based on information about an image to be displayed and projects out the modulated light onto a screen, the image displaying apparatus comprising:
   a detecting unit that detects a variation in the light quantity in a light path between the light source and the screen; and
   a controlling unit that controls a quantity of the light to be propagated to the screen,
   wherein the detecting unit includes
      a first detecting unit, positioned at a first location in the light path, that detects a quantity of the light propagating through the light path and outputs detected light quantity as a first quantity;
      a second detecting unit, positioned at a second location in the light path, that detects a quantity of the light propagating through the light path and outputs detected light quantity as a second quantity, the second location being closer to the screen than the first location; and
      a variation calculating unit that calculates the variation in the light quantity based on a difference between the first quantity and the second quantity, and
   wherein the control unit controls a quantity of the light if the second quantity decreases more than a predetermined value from the first quantity.

2. The image displaying apparatus according to claim 1, wherein
   the light source includes a plurality of the light sources each emitting light of unique wavelength, and the light path includes a light path corresponding to each of the light source;
   the first detecting unit includes a first detecting unit corresponding to each of the light paths that detects a quantity of the light propagating through the light path and outputs detected light quantity as a first quantity; and
   the variation calculating unit calculates the variation in the light quantity based on the first light quantities and the second light quantity.

3. The image displaying apparatus according to claim 2, wherein
   the second detecting unit includes a second detecting unit corresponding to each of the light paths that detects a quantity of the light propagating through the light path and outputs detected light quantity as a second quantity; and
   the variation calculating unit calculates the variation in the light quantity based on the first light quantities and the second light quantities.

4. The image displaying apparatus according to claim 2, wherein
   the variation calculating unit includes a variation calculating unit corresponding to each of the light paths, and
   the controlling unit controls a quantity of the light to be propagated to the screen based on the variation in the light quantities calculated by the variation calculating unit.

5. The image displaying apparatus according to claim 2, further comprising an adder that calculates time integration of the quantities of the lights detected by the first detecting units and a sum thereof, and outputs the sum, wherein
   the variation calculating unit calculates the variation in the light quantity based on a difference between the sum and the second quantity.

6. The image displaying apparatus according to claim 2, further comprising a light-combining unit that combines the lights propagating through the light paths to a white light, wherein
   the second detecting unit is positioned on a light path between the light-combining unit and the screen.

7. The image displaying apparatus according to claim 1, wherein the control by the controlling unit includes reducing the light quantity emitted from the light source.

8. The image displaying apparatus according to claim 1, further comprising a shutter mechanism capable of shutting out the light to be propagated through the light path to the screen, and
   the control by the controlling unit includes closing and opening the shutter.

9. The image displaying apparatus according to claim 1, wherein the first detecting unit and the second detecting unit are arranged on an optical fiber arranged in the light path between the light source and the screen.

10. A method involving spatially modulating light emitted from a light source based on information about an image to be displayed and projecting out the modulated light onto a screen, the method comprising:
    detecting a variation in the light quantity in a light path between the light source and the screen; and
    controlling a quantity of the light to be propagated to the screen,
    wherein the detecting includes
       detecting a quantity of the light propagating through a first location in the light path as a first quantity;
       detecting a quantity of the light propagating through a second location in the light path as a second light quantity, the second location being closer to the screen than the first location; and
       calculating the variation in the light quantity in the light path based on a difference between the first quantity and the second quantity, and
    wherein a quantity of the light is controlled if the second quantity decreases more than a predetermined value from the first quantity.

11. The image displaying apparatus according to claim 1, wherein the predetermined value is established at a level indicative of faulty light propagation within the light path.

12. The image displaying apparatus according to claim 11, wherein the controlling unit reduces the quantity of light to be propagated to the screen when a detected quantity of the variation exceeds the predetermined value.

13. The method according to claim 10, further comprising:

establishing the predetermined value at a level indicative of faulty light propagation within the light path.

14. The method according to claim 13, further comprising:

reducing the quantity of light to be propagated to the screen when the second quantity decreases more than the predetermined value from the first quantity.

* * * * *